United States Patent [19]
Cline

[11] Patent Number: 5,743,672
[45] Date of Patent: Apr. 28, 1998

[54] HEADBOARD ATTACHING BRACKET

[75] Inventor: David Cline, Kentfield, Calif.

[73] Assignee: Rid-Gid Products, Inc., Calif.

[21] Appl. No.: 743,856

[22] Filed: Nov. 5, 1996

[51] Int. Cl.⁶ .......................... A47C 19/02; F16B 12/46; F16B 12/54
[52] U.S. Cl. .......................... 403/403; 403/231; 403/27; 5/282.1; 5/304
[58] Field of Search .................. 403/403, 231, 403/27, 230, 233, 262; 5/288, 282.1, 304; 248/218.4, 219.3, 220.1

[56] References Cited

U.S. PATENT DOCUMENTS

| | | | |
|---|---|---|---|
| 1,156,833 | 10/1915 | Bonhard | 5/288 |
| 1,380,518 | 6/1921 | Bellig | 248/220.1 X |
| 3,188,664 | 6/1965 | Goldberg | 5/282.1 |
| 3,727,246 | 4/1973 | Germano | 5/282.1 |
| 3,877,091 | 4/1975 | Jureit et al. | 5/282.1 X |
| 4,120,600 | 10/1978 | Rees | 403/231 |
| 4,698,863 | 10/1987 | Mis | 5/282.1 X |
| 5,111,540 | 5/1992 | Caya | 403/403 X |

Primary Examiner—Anthony Knight
Attorney, Agent, or Firm—Phillips, Moore, Lempio & Finley

[57] ABSTRACT

A headboard support bracket is disclosed that, when used with independent legs on a box springs, can eliminate the need for a metal frame for support of the headboard associated with the box springs. Further, the use of the bracket eliminates the need for affixing the headboard to the wall of the room, thereby precluding relocation of the bed without removal of the headboard from the wall. The headboard support bracket is symmetrical so that it can be used on either corner of the box springs without the need to resort to "right" and "left" were the bracket asymmetrical. The bracket includes indicia means for positioning the headboard support bracket properly on the box springs.

16 Claims, 2 Drawing Sheets

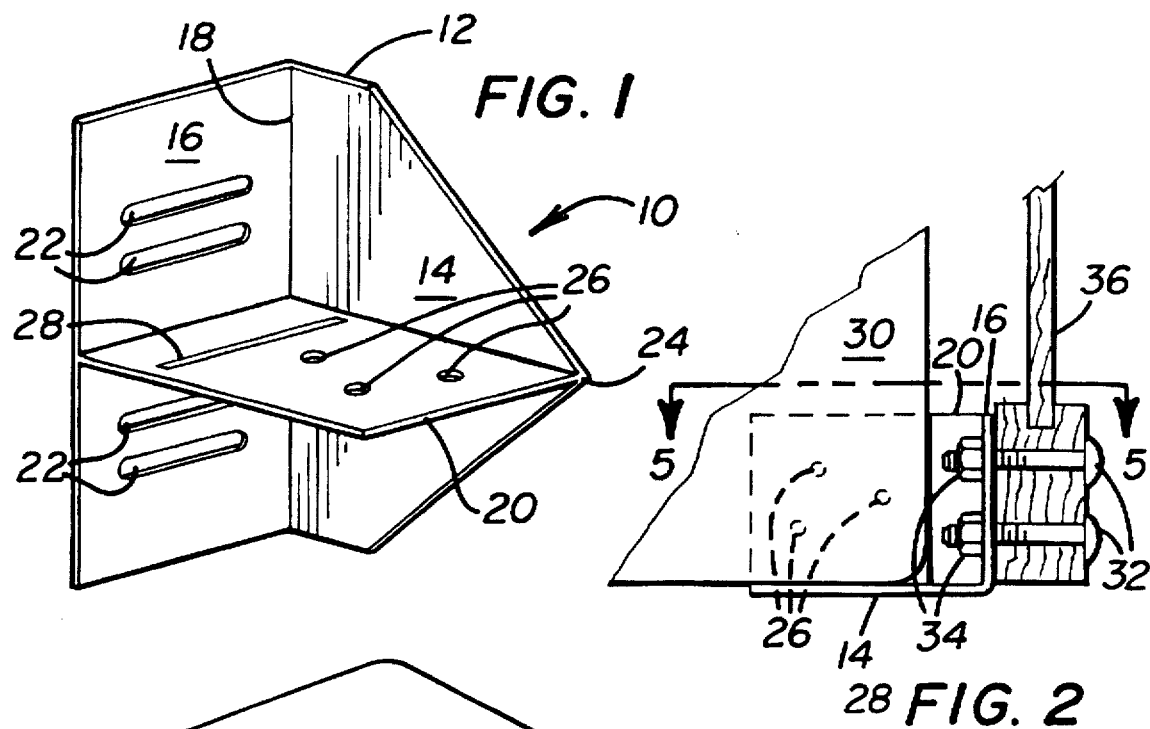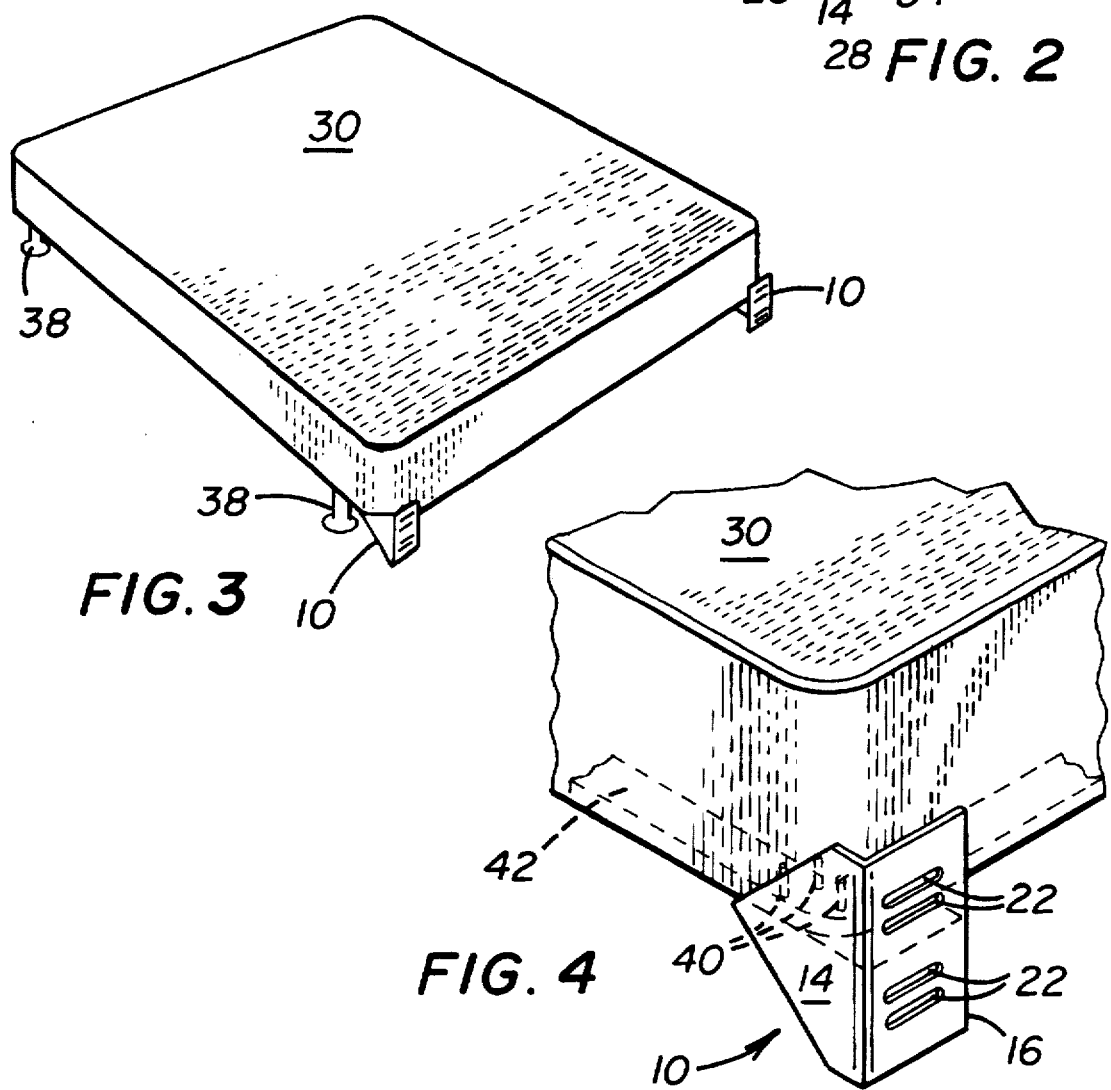

HEADBOARD ATTACHING BRACKET

This invention relates to the support of a headboard on a bed. In particular, it provides for a bracket which can be affixed to a box springs, thereby eliminating the need for affixing the headboard to a frame, or alternatively, to the wall.

BACKGROUND OF THE INVENTION

It is usual for a bed to be supported by a metal frame when there are no sideboards or footboards associated with the bed. It will be remembered that the traditional bed consisted of a headboard, a footboard, and two interconnecting sideboards. The interconnecting sideboards usually carried a cleat or the like upon which lateral slats could be placed. The mattress and springs were then supported by the lateral slats. The headboard, of course, was affixed to the sideboards, as was the footboard.

In more recent years, the footboard and sideboards have been eliminated, and a metal adjustable frames having casters affixed thereto replaces the sideboards in their role as support members for the bed. In these metal-framed systems, the box springs rests on the metal frame. Further, the headboard, which usually includes legs, is affixed to the metal frame, usually by bolts.

In the commercial environment, particularly hotels and motels, the traditional metal frame with casters has proved to be, in some instances, injurious to the walls, furniture and carpet. The bedframe has been replaced by plastic legs which are affixed to the base of the mattress frame. Such legs are disclosed in U.S. patent application Ser. No. 08/687,254, owned by the assignee of this invention. With the advent of the plastic legs, the headboard, rather than being affixed to the bedframe, has been affixed directly to the wall of the hotel or motel room. While this solution is adequate, and serves the contract industry well, it does not by itself allow the residential customer the opportunity to attach the headboard to the bed.

Accordingly, it is an object of this invention to provide a means for affixing a headboard to a box springs without the use of a metal frame.

It is a further object of this invention to provide a bracket which is readily adaptable to fit either corner of the box springs.

BRIEF DESCRIPTION OF THE INVENTION

This invention, in summary, is a headboard support bracket for use with a box springs and headboard. The headboard support bracket consists of an elongated rigid member consisting of a first side and a second side, second first and second sides integrally formed one with the other at a right angle so that a longitudinal axis is defined at the junction of the two sides. It further includes a plate defining a plane and having attachment holes therethrough for use in affixing the plate to the box springs.

The plate is rigidly affixed to the first and second sides of the elongated rigid member so that the plane of the plate is perpendicular to the longitudinal axis of the rigid member and forming a junction therewith. The first side of the rigid member defines at least two holes so that a headboard can be affixed thereto.

BRIEF DESCRIPTION OF THE DRAWINGS

FIG. 1 is a perspective view of one of the two brackets to be utilized with the box springs;

FIG. 2 is a top view showing the bracket affixed to a box springs along with a headboard;

FIG. 3 is a perspective view of a box springs with two brackets affixed thereto;

FIG. 4 is a detailed view of the bracket affixed to the box springs, as shown in FIG. 3

DETAILED DESCRIPTION OF THE PREFERRED EMBODIMENT

Figure 5:
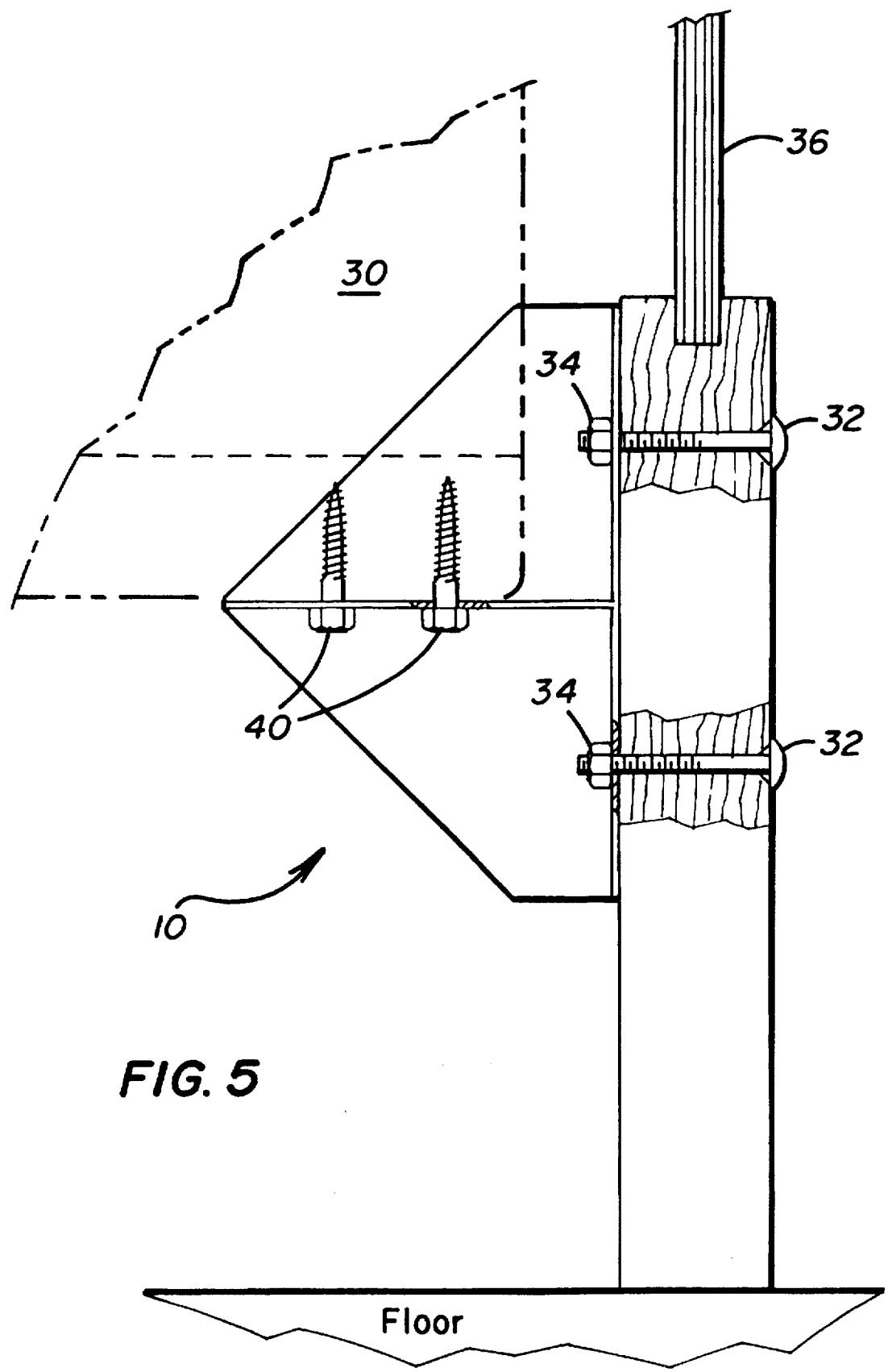
FIG. 5 is a side view of the bracket with the headboard attached and the box springs shown in phantom.

Referring to FIG. 1, a headboard support bracket 10 is shown in perspective. The bracket consists of an elongated member 12 consisting of a first side 14 and a second side 16. Preferably the bracket is of molded plastic; however, other suitable material such as a metal may be used. The first and second sides 14 and 16, respectively, are formed one with the other so that a longitudinal axis 18 is defined at the junction of the two sides. A plate 20 is affixed rigidly to the first and second sides of the member 12 so that the plane of the plate 20 is perpendicular to the longitudinal axis 18 of the junction of sides 14 and 16.

Second side 16 is preferably generally rectangular in shape and has defined therein a series of longitudinal slots 22, whose axes run generally parallel to plate 20.

First side 14 preferably is a five-sided figure which consists of an isosceles triangle with two extensions extending toward second side 16, as seen in FIG. 1.

Plate 20, preferably rectangular, which as previously noted is perpendicular to axis 18, extends outwardly and bisects the triangular-shaped side 14 such that the junction between plate 20 and side 14 terminates at the vertex 24 of the triangular shape side 14. Thus, as shown in FIG. 1, plate 20 bisects the headboard support bracket so that two of the elongated slots 22 are located on one side of plate 20 and two additional slots are located on the other sides of plate 20, making the brackets symmetrical.

Plate 20 defines therein a plurality of fastening holes 26. In addition, plate 20 includes an indicia 28 which may be in the form of a rigid bead line, or an engraved line, or simply a painted line. This indicia line is located on both sides of plate 20, even though it cannot be seen in FIG. 1 on the opposite side of plate 20. The purpose of indicia line 28 is to locate the headboard support bracket outward of the box springs (see FIGS. 2 and 3) so that fastening bolts 32, with their respective nuts 34, can affix a headboard 36 to the bracket. If the bracket were placed against the box springs 30, it would not be possible to affix the headboard to the bracket. It should be understood that the bolts 32 can be just as easily positioned in the bracket before the bracket is screwed to the box springs so that access to the nuts 34 is more easily obtained.

Alternatively, the lower elongated slots or slots below the level of the box springs can be utilized for affixing the headboard to the bracket if the headboard is sufficiently long. Freestanding headboards go all the way to the floor. As shown in FIGS. 3 and 4, it can be seen that the lower pair of the elongated slots 22 would be readily accessible to one fixing the headboard onto the box springs 30. Again, the indicia 28 is important to the positioning of the bracket 10 on the box springs 30 when the upper slots are used.

While the use and operation of this invention is readily apparent from the aforesaid description, the following comments are offered. In use, the box springs 30, which has been fitted with bed legs 38, is equipped with headboard support brackets 10 which are symmetrical with respect to the first and second sides so that they are interchangeable. The brackets 10 are affixed to the mattress by screws 40 passing through the holes 26 into the wooden frame 42 of the box springs 30. Once the bracket 10 is affixed to the box springs, then the headboard 36 can be attached to the bracket 10. The holes in the headboard 36 for the bolts 32 are measured accordingly, with holes being drilled therethrough. The bolts 32 can be fixed as shown in FIG. 2, or in like manner with the heads of the bolts adjacent the box springs or, as described above, by utilizing the lower pair of the elongated slots 22. Once the bedframe, with its associated legs 38 and the headboard 36 affixed thereto, is assembled, then it can be positioned where desired in the room, with the mattress placed on top.

During ordinary, day-to-day use, movement of the entire bed is facilitated by the plastic legs 38, with the headboard 36 being carried with the bed as it is moved about the room to facilitate cleaning.

It is to be understood that this invention is only limited by the scope and content of the appended claims.

What is claimed is:

1. A headboard support bracket for use with a box springs and headboard, the bracket comprising:

an elongated member consisting of a first and second side, said first and second sides integrally formed one with the other at a right angle so that a longitudinal axis is defined at the junction of the two sides;

a plate defining a plane and further defining at least one attachment hole therethrough for affixing said plate to a box springs;

said plate rigidly affixed to said first and second sides of said member so that the plane of said plate is perpendicular to the longitudinal axis of said member and forming a junction therewith;

said plate comprising an indicia means displaced from said second side for locating said bracket relative to said box springs;

said second side of said member defining at least two holes so that a headboard can be affixed thereto.

2. The headboard support bracket of claim 1 wherein said indicia means consists of a line permanently marked on said plate.

3. The headboard support bracket of claim 1 where the at least two holes defining said second side are elongated, each of said elongated holes defining an elongated axis, the elongated axis of each hole being substantially parallel to the plane of said plate.

4. The headboard support bracket of claim 3 wherein the at least two holes in said second side are located on one side of the junction of said plate and said second side.

5. The headboard support bracket of claim 3 where one of the at least two holes in said second side is located on one side of the junction of said plate and said second side, and the other of said at least two holes in said second side is located on the other side of the junction of said plate and said second side.

6. The headboard support bracket of claim 1 wherein the at least two holes in said second side of said member are located on one side of the junction of said plate and said first side.

7. The headboard support bracket of claim 1 where one of the at least two holes is located on one side of the junction of said plate and said second side, and the other of said at least two holes is located on the other side of the junction of said plate and said second side.

8. In combination with a box springs having a frame and independent legs, said box springs supported by said independent legs affixed to said frame, the improvement comprising:

an elongated member consisting of a first and second side, said first and second sides integrally formed one with the other at right angles so that a longitudinal axis is defined at the junction of the two sides;

a plate defining a plane and having attachment holes therethrough for affixing said plate to said box springs;

said plate rigidly affixed to said first and second sides of said member so that the plane of said plate is perpendicular to the longitudinal axis of said member and forming a junction therewith;

said second side of said member defining at least two holes so that a headboard can be affixed thereto.

9. The headboard support bracket of claim 8 further including indicia means on said plate for locating said bracket relative to said box springs.

10. The headboard support bracket of claim 9 wherein said indicia means consists of a line permanently marked on said plate, said line parallel to said second side and displaced therefrom a predetermined amount.

11. The headboard support bracket of claim 8 where the at least two holes defining said second side are elongated, each of said elongated holes defining an elongated axis, the elongated axis of each hole being substantially parallel to the plane of said plate.

12. The headboard support bracket of claim 11 wherein the at least two holes in said second side are located on one side of the junction of said plate and said second side.

13. The headboard support bracket of claim 11 where one of the at least two holes in said second side is located on one side of the junction of said plate and said second side, and the other of said at least two holes in said second side is located on the other side of the junction of said plate and said second side.

14. The headboard support bracket of claim 8 wherein the at least two holes in said second side of said member are located on one side of the junction of said plate and said first side.

15. The headboard support bracket of claim 8 where one of the at least two holes is located on one side of the junction of said plate and said second side, and the other of said at least two holes is located on the other side of the junction of said plate and said second side.

16. A headboard support bracket for use with a box springs and headboard, the bracket comprising:

an elongated member consisting of a first and second side, said first and second sides integrally formed on with the other at a right angle so that a longitudinal axis is defined at the junction of the two sides;

a plate defining a plane and defining at least one attachment hole therethrough for affixing said plate to a box springs;

said plate rigidly affixed to said first and second sides of said member so that the plane of said plate is perpendicular to the longitudinal axis of said member and forming a junction therewith;

said second side of said member defining at least four holes, two of said at least four holes formed on one side of said junction of said plate and said second side and two of said at least four holes formed on the other side of said junction of said plate and said second side, such that a headboard may be adjustably affixed to said headboard support bracket using any two of said at least four holes.

* * * * *